(12) United States Patent
Juers et al.

(10) Patent No.: US 9,902,884 B2
(45) Date of Patent: Feb. 27, 2018

(54) HOT MELT ADHESIVE COMPOSITION FOR BONDING PACKS OF PLASTIC CONTAINERS

(71) Applicant: H.B. Fuller Company, St. Paul, MN (US)

(72) Inventors: Stefan Juers, Lueneburg (DE); Vera Axer, Hamburg (DE); Ulrich Holtin, Melbeck (DE)

(*) Notice: Subject to any disclaimer, the term of this patent is extended or adjusted under 35 U.S.C. 154(b) by 1 day.

(21) Appl. No.: 14/973,372

(22) Filed: Dec. 17, 2015

(65) Prior Publication Data

US 2016/0177150 A1 Jun. 23, 2016

Related U.S. Application Data

(60) Provisional application No. 62/093,079, filed on Dec. 17, 2014.

(51) Int. Cl.

| | |
|---|---|
| C09J 153/02 | (2006.01) |
| B65D 69/00 | (2006.01) |
| B65D 85/72 | (2006.01) |
| C09J 9/00 | (2006.01) |
| C09J 11/06 | (2006.01) |
| C09J 11/08 | (2006.01) |
| B65D 21/02 | (2006.01) |
| C09J 153/00 | (2006.01) |
| C08L 53/02 | (2006.01) |

(52) U.S. Cl.
CPC ........ *C09J 153/02* (2013.01); *B65D 21/0205* (2013.01); *B65D 69/00* (2013.01); *B65D 85/72* (2013.01); *C08L 53/025* (2013.01); *C09J 9/00* (2013.01); *C09J 11/06* (2013.01); *C09J 11/08* (2013.01); *C09J 153/00* (2013.01); *C09J 153/025* (2013.01)

(58) Field of Classification Search
CPC ........ C09J 153/02; C09J 153/025; C09J 9/00; C09J 11/08; C09J 11/06; B65D 69/00; B65D 85/72
See application file for complete search history.

(56) References Cited

U.S. PATENT DOCUMENTS

| | | | |
|---|---|---|---|
| 4,411,954 A | 10/1983 | Butch et al. | |
| 4,500,021 A * | 2/1985 | Bildusas | C09J 7/0221 156/762 |
| 4,526,577 A | 7/1985 | Schmidt et al. | |
| 4,578,302 A | 3/1986 | Schmidt et al. | |
| 4,822,653 A | 4/1989 | Kauffman et al. | |
| 5,001,179 A | 3/1991 | Kauffman et al. | |
| 5,037,411 A | 8/1991 | Malcolm et al. | |
| 5,090,861 A | 2/1992 | Malcolm et al. | |
| 5,418,052 A | 5/1995 | Sugie et al. | |
| 5,714,254 A | 2/1998 | Jacob | |
| 5,939,483 A | 8/1999 | Keppers | |
| 6,103,814 A | 8/2000 | VanDrongelen et al. | |
| 6,162,859 A | 12/2000 | Lu et al. | |
| 6,486,229 B1 | 11/2002 | Ziyi et al. | |
| 6,818,093 B1 | 11/2004 | Taal et al. | |
| 6,987,142 B2 | 1/2006 | St. Clair et al. | |
| 7,262,251 B2 | 8/2007 | Kanderski et al. | |
| 7,906,583 B2 | 3/2011 | Lechat et al. | |
| 8,263,696 B2 | 9/2012 | Goubard et al. | |
| 8,703,263 B2 | 4/2014 | De Keyzer et al. | |
| 2003/0181584 A1 | 9/2003 | Dale et al. | |
| 2005/0176887 A1 | 8/2005 | St. Clair | |
| 2005/0182194 A1 | 8/2005 | He et al. | |
| 2006/0234580 A1 | 10/2006 | Sustic | |
| 2007/0249781 A1 | 10/2007 | De Keyzer et al. | |
| 2008/0081858 A1 | 4/2008 | Okazaki | |
| 2008/0153981 A1 | 6/2008 | Goubard et al. | |
| 2008/0306214 A1 | 12/2008 | Kanderski | |
| 2009/0291298 A1 | 11/2009 | Robert et al. | |
| 2011/0021103 A1* | 1/2011 | Alper | B32B 5/26 442/329 |
| 2014/0324006 A1 | 10/2014 | Zhong | |
| 2015/0017868 A1* | 1/2015 | Stafeil | C09J 157/02 442/381 |
| 2015/0037579 A1 | 2/2015 | Juers et al. | |
| 2015/0197671 A1* | 7/2015 | Becker | B32B 37/1207 206/503 |
| 2016/0068723 A1 | 3/2016 | Moriguchi et al. | |

FOREIGN PATENT DOCUMENTS

| | | |
|---|---|---|
| EP | 0302394 B1 | 2/1989 |
| EP | 1564273 A1 | 8/2005 |
| EP | 1566423 A1 | 8/2005 |
| EP | 1719809 | 11/2006 |
| GB | 1456003 | 11/1976 |
| JP | 62081470 A | 4/1987 |
| JP | 63043983 A | 2/1988 |
| JP | 1144483 | 6/1989 |
| JP | 6078508 | 10/1994 |
| JP | 7057867 B2 | 6/1995 |
| JP | 02637269 | 8/1997 |
| JP | 03495277 | 2/2004 |
| WO | WO1992/008763 A1 | 5/1992 |
| WO | WO98/02498 A1 | 1/1998 |
| WO | WO2003/044087 A2 | 11/2007 |
| WO | WO2013/004337 | 1/2013 |
| WO | WO2013/004339 | 1/2013 |
| WO | WO2013/004340 | 1/2013 |
| WO | WO2013/004341 | 1/2013 |
| WO | WO2013/011561 | 1/2013 |
| WO | WO2014/189150 | 11/2014 |
| WO | WO2015/007785 | 1/2015 |

* cited by examiner

*Primary Examiner* — Jeffrey Mullis
(74) *Attorney, Agent, or Firm* — Kirsten Stone; Kristi Halloran

(57) ABSTRACT

The present invention relates to a hot melt adhesive composition, comprising based on the total weight of the hot melt adhesive composition: (a) more than 25 weight percent of at least one block copolymer, (b) from about 27 to about 45 weight percent of at least one plasticizer, (c) from about 18 to less than about 55 weight percent of a combination of at least two different resins; and (d) optionally up to 10% weight percent of at least one wax. The hot melt adhesive composition of the invention can be used for bonding bundles of plastic containers such as bottles into packs.

14 Claims, No Drawings

HOT MELT ADHESIVE COMPOSITION FOR BONDING PACKS OF PLASTIC CONTAINERS

This application claims the benefit of U.S. Provisional Application No. 62/093,079, filed Dec. 17, 2014, which is incorporated herein.

FIELD OF THE INVENTION

The present invention relates to a hot melt adhesive composition comprising a block copolymer, a plasticizer, and a combination of at least two different resins. The hot melt adhesive composition according to the present invention is especially suitable for bonding plastic containers such as PET bottles into packs. Thus, the present invention also relates to the use of the inventive hot melt adhesive composition for bonding bundles of plastic containers into packs. The present invention further relates to a container pack comprising a plurality of plastic containers, wherein the containers are bonded to each other with a hot melt adhesive composition according to the invention.

BACKGROUND OF THE INVENTION

Hot melt adhesive compositions are well known in the art. Such hot melt adhesives are typically solid at room temperature and are applied to a substrate when molten, and then placed in contact with a second substrate. The adhesive cools and hardens to form a bond between the substrates. Hot melt adhesives are typically composed of at least two components: (a) a polymer; and (b) a resin. Optionally, various amounts of wax and plasticizer may further be employed. The polymer provides the formulation with its strength and adhesive characteristics. Typically, a thermoplastic polymer is used. The thermoplastic polymer may be selected from homopolymers, copolymers (e.g. interpolymers) or block copolymers. The resin allows the thermoplastic polymer to be more adhesive by improving wetting during the application. Resins are added to give tack to the adhesive and also to lower viscosity. Tack is required in most adhesive formulations to allow for proper joining of articles prior to the hot melt adhesive solidifying. One function of the wax component is to lower the viscosity of the hot melt adhesive. Low viscosity helps to lower application temperatures, provide cleaner processing, and also good wet out of the substrates. Furthermore, a low viscosity allows for liquefaction of the hot melt adhesive. In addition, due to the presence of the wax component, the hot melt adhesive crystallizes quickly which helps the material to harden or set quickly. Thus, the wax component also controls the open time and set speed of the system. The plasticizer also helps to lower viscosity and can additionally be used to impart permanent tack properties to the hot melt adhesive.

It is known in the art to use hot melt adhesives for bonding containers into packs. For example, WO 2013/004340 and WO 2013/004337 describe methods for producing packs of containers by bonding the containers to each other using an adhesive such as a hot melt adhesive. By directly bonding containers such as bottles using an adhesive, waste resulting from shrink wrap with LDPE films on the bottle packs can be avoided. This also saves considerable amounts of energy since, for example, shrink wrapping involves six-packs being moved through a heating tunnel which uses large amounts of energy. Furthermore, a smaller packing line footprint and increased packing line speeds are possible. Also, the optical appearance of six-packs is improved, since undesirable creases in the shrink wrap are avoided. This improvement in appearance is highly desirable, because beverage filling companies are concerned about the appearance of their packaged product. Generally, any secondary packaging of container packs, such as carton or cardboard cases, sheaths, plastic rings, etc. can be avoided.

However, when using an adhesive such as a hot melt adhesive for directly bonding containers to each other, it is necessary to provide on the one hand a reliable bond between the containers. On the other hand, it is also required to ensure easy separation of the containers so that an individual container can be separated from the pack. Generally, a reliable bond can be provided by using a higher adhesive force, i.e. a stronger bond. By contrast, easy separation can be ensured by applying a lower adhesive force. Thus, providing simultaneously for a reliable bond and for easy separation represent conflicting goals.

Containers can be made from a variety of materials. Therefore, a hot melt adhesive composition used for bonding containers should be specifically selected to reliably bond a given material.

Various plastics are used to make containers that could benefit from adhesive bundling. Possible plastics include e.g. polyethylene terephthalate (PET), polyethylene napthalate (PEN), other polyesters, polyethylene (e.g. high density polyethylene (HDPE)), polypropylene (PP), polystyrene (PS) and polycarbonate. The inventors also envision that the hot melt adhesives of this invention could be useful for bundling containers based partially or entirely on bio-based and/or bio-degradable polymers such as e.g. poly lactic acid (PLA).

The adhesives of this invention are particularly useful for bonding PET. Polyethylene terephthalate (PET) is a thermoplastic polymer having excellent moisture barrier properties. Therefore, PET is widely used for making containers for e.g. liquids such as beverage, or food. In addition, PET can easily be recycled.

Thus, there is a need in the art for hot melt adhesives for reliably bonding plastic containers to each other into packs, while at the same time being easily separable from each other. It is further desirable that such hot melt adhesives are removable (i.e. can be stripped cleanly from the container, leaving no adhesive residue behind) after use, e.g. during recycling

SUMMARY OF THE INVENTION

The objection of the present invention is to meet the above needs. In particular, an object of the present invention is the provision of a hot melt adhesive composition especially suitable for bonding plastic (e.g. PET) containers into packs.

The present invention relates to a hot melt adhesive composition, comprising based on the total weight of the hot melt adhesive composition:
a) more than 25 weight percent of at least one block copolymer;
b) from about 20 to about 50 weight percent of at least one plasticizer;
c) from about 18 to less than about 55 weight percent of a combination of at least two different resins; and
d) optionally up to 10 weight percent of at least one wax.

For example, the hot melt adhesive composition of the invention comprises, based on the total weight of the hot melt adhesive composition, from more than 25 to about 50 weight percent of the at least one block copolymer. Preferably, the at least one block copolymer is comprised in the inventive hot melt adhesive composition in an amount of from about 25 to about 40 weight percent, more preferably from about 25 to about 34 weight percent, and even more preferably from about 26 to about 32 weight percent.

In combination or independently of the above, the hot melt adhesive composition of the invention comprises, based on the total weight of the hot melt adhesive composition, from about 20 to about 40 weight percent of the at least one plasticizer. Preferably, the at least one plasticizer is comprised in the inventive hot melt composition in an amount of from about 25 to about 38 weight percent, from about 27 to about 45 weight percent, more preferably from about 29 to about 37 weight percent, and even more preferably from about 30 to about 35 weight percent.

In combination or independently of the above, the hot melt adhesive composition of the invention comprises, based on the total weight of the hot melt adhesive composition, from about 25 to about 45 weight percent of the combination of at least two different resins. Preferably, the combination of at least two resins is comprised in the inventive hot melt composition in an amount of from about 26 to about 40 weight percent, from about 27 to about 38 weight percent, more preferably from about 29 to about 37 weight percent.

The inventive hot melt adhesive may also comprise a wax, although a wax is an optional component of the hot melt adhesive according to the present invention. In some embodiments, the hot melt adhesive composition of the invention comprises, based on the total weight of the hot melt adhesive composition, from 0 to about 9 weight percent of at least one wax. In preferred embodiments, the at least one wax may be included in the inventive hot melt composition in an amount of from 0 to about 8 weight percent, such as from about 3 to about 8 weight percent.

The at least one block copolymer preferably has at least one A block that includes a vinyl aromatic compound, and at least one B block that includes an elastomeric hydrogenated or unhydrogenated conjugated diene and combinations thereof. Preferably, the at least one block copolymer is a linear A-B block, linear A-B-A block, linear A-(B-A)$_n$-B multi-block, and radial (A-B)$_n$-Y block where Y is a multivalent compound and n is an integer of at least 3, linear A-B-A-B tetrablock, or linear A-B-A-B-A pentablock copolymer. Suitable are also functionalized or grafted versions of the above block copolymers e.g. grafted with maleic anhydride.

The at least one block copolymer is preferably selected from at least one of a diblock styrenic block copolymer, or a triblock styrenic block copolymer. More preferably, the at least one block copolymer is selected from a triblock styrenic block copolymer. In still further preferred embodiments, the at least one block copolymer is selected from a styrene-ethylene/butylene-styrene (SEBS), styrene-butadiene-styrene (SBS), styrene-ethylene/propylene-styrene (SEPS), styrene-isoprene-styrene block copolymers (SIS), and styrene-ethylene-ethylene/propylene-styrene block copolymer, and most preferably is SEBS.

It is further preferred that the at least one block copolymer has a styrene content of about 13 to about 50 weight percent, preferably about 20 to about 40 weight percent, more preferably about 25 to about 35 weight percent.

In some embodiments, diblock copolymers are not preferred. Thus, in an embodiment, the at least one block copolymer has a diblock content of 30 weight percent or less. Preferably, the at least one block copolymer has a diblock content of 20 weight percent or less, more preferably 10 weight percent or less. More preferably, the at least one block copolymer does not comprise diblock.

The at least one plasticizer may be a mineral oil. Preferably, the at least one plasticizer is a paraffinic or naphthenic mineral oil, even more preferably a paraffinic mineral oil.

The at least two different resins preferably both have a Ring & Ball softening point of at least about 75° C. Preferably, the at least two different resins both have a Ring & Ball softening point of at least about 100° C., more preferably at least about 110° C., still more preferably at least about 115° C. Most preferably, the at least two different resins both have a Ring & Ball softening point of at least about 118° C.

It is preferred according to the invention that the combination of at least two different resins comprises at least one aromatic hydrocarbon resin and at least one aliphatic hydrocarbon resin. In preferred embodiments, the weight ratio of aromatic hydrocarbon resin to aliphatic hydrocarbon resin is 3:1 to 1:3, more preferably is 2:1 to 1:2, still more preferably is 1.5:1 to 1:1.5, even more preferably 1.2:1 to 1:1.2.

The aliphatic hydrocarbon resin may in some embodiments be selected from aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof. Preferably, the aliphatic hydrocarbon resin is a hydrogenated hydrocarbon resin, such as hydrogenated dicyclopentadiene hydrocarbon resin. In some embodiment, the aliphatic hydrocarbon resin may include minor amounts of aromatic vinyl monomers in an amount of up to 15%.

The aromatic hydrocarbon resin is derived from aromatic vinyl monomers. Aromatic hydrocarbon resins can have greater than 50 weight percent aromatic content, or even greater than 60 weight percent aromatic content. In some embodiments, the aromatic hydrocarbon resin comprise monomers selected from the group consisting of styrene, alpha methyl styrene, vinyl toluene, and indene.

The optional wax may be selected e.g. from paraffin waxes, microcrystalline waxes, Fischer-Tropsch waxes, synthetic high melting point waxes (HMP), polyethylene wax, polypropylene wax. Preferably, the wax, if present is selected from the group consisting of a microwax and a Fischer-Tropsch wax and grafted or functionalized versions thereof.

The hot melt adhesive composition according to the present invention may also comprise conventional additives. For example, the hot melt adhesive composition may comprise at least one additive selected from antioxidants, antiblock additives (e.g. a coextrusion coating, packaging film, or dusting agents, etc.), pigments, rheology modifying additives (e.g. fumed silica), adhesion promoters and fillers (e.g. clay, talc, or carbonates).

The hot melt adhesive composition according to the present invention may preferably have a Brookfield viscosity at a temperature of 175° C. (spindle 27, spindle speed of 20 rpm), in the range of from about 2,000 to about 15,000 cps. In some embodiments, the hot melt adhesive composition has a Brookfield viscosity at a temperature of 175° C. in the range from about 4,000 to about 12,000 mPa·s, more preferably in the range of from about 5,000 to about 10,000 cps.

In the hot melt adhesive composition according to the invention, the sum of components a), b), c) and d) amounts preferably to at least 90 weight percent. More preferably, the sum of components a), b), c) and d) amounts at least 95 weight percent of the total adhesive composition.

Furthermore, the present invention relates to the use of the above hot melt adhesive composition for bonding bundles of plastic containers such as bottles into packs. In some embodiments, the hot melt adhesive composition is applied directly onto the plastic containers.

In addition, the present invention provides a container pack comprising a plurality of plastic containers, wherein the containers are bonded to each other with a hot melt adhesive composition as defined above.

Possible plastics in connection with uses or container packs according to the invention include e.g. polyethylene terephthalate (PET), polyethylene napthalate (PEN), other polyesters, polyethylene (e.g. high density polyethylene (HDPE)), polypropylene (PP), polystyrene (PS) and polycarbonate. Other possible plastics include materials based partially or entirely on bio-based and/or bio-degradable polymers such as e.g. polylactic acid (PLA). In a preferred embodiment, the containers are made of PET.

The hot melt adhesive composition of the present invention exhibits a combination of improved properties, including excellent viscosity and color fastness/color stability, particularly at elevated temperatures; high cohesive strength, low to no surface tack, improved adhesion to plastic substrates while being easily separated, particularly for containers such as bottles made of PET.

Furthermore, the hot melt adhesive of the present invention is particularly suitable for and designed to form, for example, a six pack of plastic bottles by directly adhering the bottles together with the hot melt adhesive rather than by shrink wrapping them.

The hot melt adhesive composition of the invention has a unique combination of good low temperature (for refrigeration) and high temperature (for shipping) resistance, which is required especially for the bonding of plastic beverage bottle packs. For example, packs or bundles of plastic bottles bonded together with the adhesive of the invention are able to remain bonded when exposed to condensed water on the surface of the bottle. Furthermore, the adhesives of the invention exhibit well balanced cohesive properties allowing for the plastic bottles being pulled apart by the consumer when beverages are consumed.

DETAILED DESCRIPTION OF THE INVENTION

In general, hot melt adhesives are thermoplastic compositions as defined herein that are applied in a molten or flowable form. For many applications, hot melt adhesives are employed to bond two or more substrates while the adhesive is sufficiently molten. In other instances, the adhesive may be applied to a single substrate and cooled. The adhesive is subsequently bonded to a second substrate or surface with heat re-activation. For the purpose of the invention, "hot melt adhesive" refers to all such adhesive compositions.

The following abbreviations and definitions are used in the context of the present invention.

The undefined article "a" or "an" means one or more of the species designated by the term following said article. For example, "a particulate form" encompasses one or more particulate forms.

The term "about" in the context of the present application means a value within 15% (±15%) of the value recited immediately after the term "about," including any numeric value within this range, the value equal to the upper limit (i.e., +15%) and the value equal to the lower limit (i.e., −15%) of this range. For example, the phrase "about 100" encompasses any numeric value that is between 85 and 115, including 85 and 115 (with the exception of "about 100%", which always has an upper limit of 100%). A further exception is the phrase "about 0" or "about 0%", which always has a lower limit of 0 or 0%). In a preferred aspect, "about" means±10%, even more preferably ±5%, even more preferably ±1% or less than ±1%.

The amount of a specific component, which is included in the hot melt adhesive composition may be defined as the weight per weight percentage as defined by the following ratio: wt.-%=(g of specific component)/(g of composition comprising specific components). For example, when 2.5 g of wax in 100 g of a hot melt adhesive are used, this results in a ratio of 2.5 wt-% (2.5/100) of wax.

For the purpose of the present invention, the term "hot melt" or "hot melt composition" refers to a solvent free product which is substantially solid at room temperature, e.g. at a temperature between about 20° C. and about 25° C. When heated the hot melt becomes tacky and preferably liquid (molten) and can be applied, for example to a substrate to provide an adhesive surface.

Further details of the present invention are described in the following.

Block Copolymer

A block copolymer is an essential component of the hot melt adhesive of the present invention. Suitable block copolymers for use in the present invention include those having at least one A block that includes a vinyl aromatic compound and at least one B block that includes an elastomeric conjugated diene, including hydrogenated or unhydrogenated conjugated dienes, and combinations or functionalized or grafted (e.g. grafted with maleic anhydride) versions thereof. The A blocks and the B blocks may bind to one another in any manner of binding such that the resulting copolymer is random, block, straight-chained, branched, radial, tapered or a combination thereof. The block copolymer can exhibit any form including, e.g., linear A-B block, linear A-B-A block, linear A-(B-A)$_n$-B multi-block, and radial (A-B)$_n$-Y block where Y is a multivalent compound and n is an integer of at least 3, tetrablock copolymer, e.g., A-B-A-B, and pentablock copolymers having a structure of A-B-A-B-A.

The at least one block copolymer can include blends of at least two different block copolymers. When the adhesive composition includes a blend of at least two different block copolymers, the properties stated herein (e.g. styrene content, diblock content, etc.) take into account all of the at least two different block copolymers. For example, if more than one block copolymer is used in the adhesive composition, the diblock content is the average of the diblock contents of the blend of block copolymers.

For example, the diblock content of a blend of 50% by weight block copolymer A (diblock content=0) and 50% by weight block copolymer B (diblock content=20) is calculated as follows:

Diblock content=0.5(0%)+0.5(20%)=0+10=20%

In preferred embodiments, the at least one block copolymer is a diblock block copolymer, or a triblock block copolymer having aromatic end blocks. More preferably, the at least one block copolymer is selected from a triblock styrenic block copolymer with aromatic end blocks.

In some embodiments, diblock copolymers are not preferred. Thus, in a further preferred embodiment, the at least one block copolymer has a diblock content of 30 weight percent or less. Preferably, the at least one block copolymer has a diblock content of 20 weight percent or less, more preferably 10 weight percent or less. More preferably, the at least one block copolymer does not comprise diblock.

Useful vinyl aromatic compounds include, e.g., styrene, alpha-methylstyrene, o-methylstyrene, m-methylstyrene, p-methylstyrene, p-tert-butylstyrene, 2,4-dimethylstyrene, 2,4,6-trimethylstyrene, diphenylethylenes including stilbene, vinyl naphthalene, vinylanthracene, vinyltoluene (a mixture of meta- and para-isomers of methylstyrene), vinylxylene, and combinations thereof. Suitable conjugated dienes include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof.

Useful block copolymers include polyvinyl aromatic in an amount between about 13 wt % and about 50 wt %, between about 20 wt % and about 40 wt %, or even between about 25 wt % and about 35 wt %. Suitable block copolymers have a melt flow index between about 1 g/10 min and about 100 g/10 min, between about 1 g/10 min and about 50 g/10 min, between about 1 g/10 min and about 20 g/10 min, or even less than about 20 g/10 min as determined by ASTM-D 1238 (230° C., 5-kg).

The A block can also include a small amount (e.g. no greater than 10 wt % based on the weight of the A block) of a structural unit derived from unsaturated monomers other than the vinyl aromatic compounds including, e.g., 1-butene, pentene, hexene, butadiene, isoprene, methyl vinyl ether, methyl methacrylate, vinyl acetate and combinations thereof. The B block can also include a small amount (e.g., no greater than 10 wt % based on the amount of the B block) of a structural unit derived from unsaturated monomers other than the conjugated diene including, e.g., 1-butene, 1-pentene, 1-hexene, methyl vinyl ether, styrene, methyl methacrylate, and combinations thereof.

Useful block copolymers include or may be based on, e.g., random styrene-butadiene polymers, styrene-butadiene block copolymers, multiarmed and repeating styrene-butadiene copolymers, styrene-butadiene-styrene (SBS) block copolymers, styrene-isoprene block copolymers, styrene-isoprene-styrene (SIS) block copolymers, styrene-multiarmed styrene-isoprene (SI)$_x$ block copolymers, styrene-ethylene-butylene-styrene block copolymers (SEBS), styrene-isobutylene-styrene block copolymers (SIBS), styrene-ethylene-ethylene-propylene-styrene block copolymers (SEEPS), styrene-ethylene-propylene-styrene block copolymers (SEPS) and combinations thereof.

The at least one block copolymer is preferably selected from a styrene-ethylene/butylene-styrene (SEBS), styrene-ethylene/propylene-styrene (SEPS) and styrene-ethylene-ethylene/propylene-styrene block copolymer, and most preferably is SEBS.

Block copolymers for use in the invention are commercially available under the KRATON D and G series of trade designations from Shell Chemical Company (Houston, Tex.) including, e.g., KRATON D 1163, D1161S and 1117 and KRATON G 1652, 1657 and 1726, EUROPRENE SOL T trade designation from EniChem (Houston, Tex.), SEPTON trade designation from Septon Company of America (Pasadena, Tex.) including SEPTON S 1001 styrene-ethylene-propylene-styrene block copolymer, and SEPTON 4030, 4033, 4044, 4055 and 4077 block copolymers, and VECTOR series of trade designations from Dexco (Houston, Tex.) including VECTOR 4211, 4411 A, 4414A, styrene-isoprene-styrene block copolymers.

Also suitable as the block copolymer component in the present invention are based thermoplastic elastomers such as from the Globalprene series, available from LCY Chemical Corp. Examples are GLOBALPRENE SEBS 9550, 9551, 9552, 9553, or 9554.

Preferably, the at least one block copolymer has a styrene content of about 13 to about 50 weight percent, preferably about 20 to about 40 weight percent, more preferably about 25 to about 35 weight percent.

The at least one block copolymer is present in the hot melt adhesive composition in an amount of more than 25 weight percent, between about 25 to about 50 weight percent, between about 25 to about 40 weight percent, between about 25 to about 34 weight percent, or between about 26 to about 32 weight percent.

Plasticizer

A further essential component of the inventive hot melt adhesive composition is at least one plasticizer. The plasticizer may be included in an amount of from about 20 to about 50 weight percent, from about 20 to about 40 weight percent, from about 25 to about 38 weight percent, from about 27 to about 40, from about 29 to about 37 weight percent, or from about 30 to about 35 weight percent.

Suitable plasticizers include e.g. oil, polybutene, or a combination thereof. Useful classes of oils include, e.g., naphthenic petroleum-based oils, medicinal white oils, paraffinic oils, mineral oils, animal oils, vegetable oils, synthetic oils, derivatives of oils, glycerol esters of fatty acids, and combinations thereof. Preferably, the plasticizer is a paraffinic or naphthenic mineral oil. In a preferred embodiment, the plasticizer is a paraffinic medicinal white oil, such as SHELL ONDINA 941.

Resins

The hot melt adhesive composition according to the invention also comprises as an essential component a combination of at least two resins.

The hot melt adhesive of the invention comprises from 18 weight percent to less than about 55 weight percent of the combination of at least two different resins, preferably from 25 weight percent to about 45 weight percent, more preferably from about 26 to about 40 weight percent, still more preferably from about 27 to about 37 weight percent, still further preferably from about 28 to about 35 weight percent of the combination of at least two different resins. Resins can be at least partially hydrogenated in order to improve stability for bulk handling. Preferred resins have Ring and Ball softening point of at least about 75° C., preferably at least about 100° C., more preferably at least about 110° C., still more preferably at least about 115° C., and most preferably at leat about 118° C.

The resins can be liquid or solid at room temperature. Suitable classes of resins include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin.

Examples of useful polyterpene resins include polyterpene resins having a softening point, as determined by DIN EN 1427 (Ring and Ball) of from about 75° C. to about 180° C., hydrogenated polyterpene resins, and copolymers and terpolymers of natural terpenes (e.g. styrene-terpene, alpha-methyl styrene-terpene and vinyl toluene-terpene). Examples of useful aliphatic and cycloaliphatic petroleum hydrocarbon resins include aliphatic and cycloaliphatic petroleum hydrocarbon resins having Ring and Ball softening points of from about 75° C. to about 140° C. (e.g., branched and unbranched C5 resins, C9 resins, and C10 resins) and the hydrogenated derivatives thereof.

Useful resins are commercially available under a variety of trade designations including, e.g., the ESCOREZ series of trade designations from Exxon Mobil Chemical Company (Houston, Tex.) including ESCOREZ 1310 LC, ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including EASTOTAC H-100R, EASTOTAC H-100L, and EASTOTAC H130W, the WINGTACK series of trade designations from Cray Valley HSC (Exton, Pa.) including WINGTACK 86, WINGTACK EXTRA, and WINGTACK 95, the PICCOTAC, PICCOTEX, KRISTALEX and PLASTOLYN series of trade designations from Eastman Chemical Company (Kingsport, Tenn.) including, e.g., PICCOTEX 120, PICCOTAC 8095, KRISTALEX 3100, PLASTOLYN 240 and PLASTOLYN 290, the SUKOREZ trade designations from Kolon Industries Inc., Korea including, e.g., SUKOREZ SU-90, SUKOREZ SU-100, and SUKOREZ SU-120 and the SYLVARES trade designations from Arizona Chemical, USA including e.g., SYLVARES TR 7115 and SYLVARES SA 140.

In a preferred embodiment, the combination of at least two resins comprises at least one aromatic hydrocarbon resin and at least one aliphatic hydrocarbon resin. Aromatic hydrocarbon resins may also be referred to as end block reinforcing resins. Aliphatic hydrocarbon resins may be referred to as midblock modifying/tackifying resins. The aromatic hydrocarbon resin (endblock reinforcing resin) may be employed to impart further cohesive strength. The aliphatic hydrocarbon resin (midblock modifying resin) is used for providing sufficient tack. By selecting an appropriate ratio of aromatic hydrocarbon resin to aliphatic hydrocarbon resin it is possible to achieve a desired adhesion/cohesion balance while avoiding surface tackiness. In a preferred embodiment, the weight ratio of aromatic hydrocarbon resin to aliphatic hydrocarbon resin is 3:1 to 1:3, preferably is 2:1 to 1:2, still more preferably is 1.5:1 to 1:1.5, still more preferable is 1.2:1 to 1:1.2.

Examples of suitable aliphatic hydrocarbon resins include but are not limited to aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof, including slightly aromatic resins having a content of aromatic monomers of up to 15 weight %. Preferably, the aliphatic hydrocarbon resin is hydrogenated.

Suitable examples of the aromatic hydrocarbon resin include but are not limited to aromatic hydrocarbon resins comprising monomers selected from the group consisting of styrene, alpha methyl styrene, vinyl toluene, indene, or any other aromatic monomer or end block associating monomer. Aromatic hydrocarbon resins can have greater than 50% by weight aromatic content, or even greater than 60% aromatic content.

Waxes

Waxes are an optional component of the inventive hot melt adhesives. Waxes are commonly used to modify the viscosity and reduce tack. Waxes may be included in the hot melt adhesive compositions of the present invention only in low amounts, at concentrations less than 10 wt-%, preferably at concentrations ranging up to 9 wt-%, more preferably in amounts ranging up to 8 wt-%, such as from about 3 wt-% to about 8 wt-%.

Waxes useful in the adhesives of the present invention include paraffin waxes, microcrystalline waxes, Fischer-Tropsch waxes, including medium MP grades such as Paraflint C-80, oxidized Fischer-Tropsch waxes, polyethylene wax and by-products of polyethylene wherein $M_w$ is less than 3000, polypropylene wax, single-site (e.g. metallocene) catalyzed waxes and grafted or functionalized versions thereof (e.g. maleated or oxidized). The terminology "synthetic high melting point" (HMP) waxes includes high density low molecular weight polyethylene waxes, by-product polyethylene waxes, and Fischer-Tropsch waxes.

In a preferred embodiment, the wax is selected from a group consisting of a hydrogenated or a non-hydrogenated microwax and Fischer-Tropsch wax or grafted or functionalized versions thereof.

Optional Additional Polymers

The hot melt adhesive composition may optionally include additional polymers. Useful optional additional polymers include styrene block copolymers, polyamides and polyolefin polymers including e.g., amorphous polyalphaolefins, semi-crystalline polyolefins (e.g. polyethylene or polypropylene homopolymers/copolymers, and combinations thereof.

Additives

The hot melt adhesive composition of the present invention may include additives commonly used in hot melt adhesives. For example, components can be added to modify the tack, color, odor, etc., of a hot melt adhesive. Additives such as antioxidants, for example, hindered phenolics (for example, IRGANOX 1010, IRGANOX 1076, EVERNOX 10, all BASF, or VULKANOX BHT, Lanxess), phosphites (for example, IRGAFOS 168, BASF), thioesters (for example, IRGANOX PS800 from BASF), multifunctional phenolic thioester (for example, INRGANOX 1726 from BASF) or any mixtures thereof, antiblock additives (e.g. a coextrusion coating, packaging film, or dusting agents, etc.), pigments, theology modifying additives (e.g. fumed silica), adhesion promoters and fillers (e.g. clay, talc, or carbonates), can also be included in the formulations.

It is generally preferred that the additives should be relatively inert and have negligible effects upon the properties contributed by the block copolymer, plasticizer, combination of agents, and optional wax.

Additives may be generally used in small amounts, typically less than 10 weight percent, preferably less than or up to 5 weight percent, or even up to 3 weight percent. One or more antioxidants are typically present in an amount of less than 2 weight percent, preferably less than 1 weight percent. Combinations of at least two different antioxidants are preferred, particularly preferred three different antioxidants in combination, to impart color stability. Antioxidants are specifically preferred ingredients to ensure thermal stability of the adhesives at high application temperatures of at least about 190° C., to avoid color changes such as yellowing, avoidance of which is typically desired for aesthetic reasons.

Uses

The hot melt adhesive compositions of the present invention are specifically designed and adapted for bonding bundles of plastic containers such as bottles into packs, preferably six-packs. The containers can be of any size including but not limited to 500 milliliters (mls), 591 mls, 1.0 liter, 1.5 liter, or even from 150 mls to about 2000 mls, etc. In a more preferred embodiment, the containers include PET bottles, preferably having a size of about 1.5 liter. The content of the containers can vary. The content can be beverages such as e.g. water, carbonated water/soda, energy drinks, etc.

Methods for producing such packs or bundles with the use of adhesives are generally described for example in international patent applications WO 2013/004337 A1, WO 2013/004339 A1, WO 2013/004340 A1, and WO 2013/004341 A1, all incorporated herein by reference. In such methods, the hot melt adhesive composition of the present invention can be applied directly onto the containers or bottles, on backing sheets between two groups of containers, or both, and allows separating the containers from groups in a non-destructive manner, for example when bottles are pulled apart by the consumer when beverages are consumed.

For example, the use of the hot melt adhesive composition for gluing two plastic bottles to each other a typical procedure involves that the molten adhesive having a temperature of about 150° C. to about 200° C. is rapidly shot with a conventional applicator onto at least one bottle, e.g. onto opposing sides on two standing bottles (one shot takes approximately 50-100 miliseconds (ms)), e.g., at the bottom below the label and one on top in a spot where the two bottles touch each other; after about 2 seconds the bottles are combined and pressed together for about a few seconds, such as 5 seconds.

The particular application pattern may be varied as desired. For example, leaving out one or more adhesive spots for better bottle release from the pack can be envisaged, or more adhesive spots for large and heavy bottles. The hot melt adhesive can be applied foamed or unfoamed.

The adhesive can be applied in a spot on each of the bottles to be bundled so as to give an adhesive to adhesive bond between the bottles. The adhesive could be the same adhesive on each bottle, or could be different adhesives. Alternatively, the adhesive could be applied to just one of the bottles to be bundled.

Typically, the amount of adhesive used per shot varies from about 20 to about 150 mg/shot, usually at about 80 mg/shot. Since such a process is dynamic, times and amounts may vary depending on the size of the plastic containers such as a bottle and depending on the required ease of separation of the bottles upon use by the customer.

Six packs or other desired pack sizes may be built up similarly, e.g. by gluing together pairs of bonded bottles, or by bonding bottles on backing sheets between two groups of bottles or containers, as described in the above mentioned international patent applications.

The adhesives of the invention have good low temperature (for refrigeration) and high temperature (for shipping) resistance and are able to remain bonded when exposed to condensed water on the surface of the bottle. Also, the adhesive compositions of the invention are flexible enough to allow bottle expansion during warming up when carbonized water or soft drinks are filled and glued together at low temperature such as 3° C. and bottle expansion occurs when the bottle warms up to room temperature. For example, bottle expansion of low temperature filled plastic bottles can result in an extension in the range of 1-5 mm and the adhesive of the invention allows this kind of force and keeps the bond closed.

By directly bonding bottles, the adhesives of the invention contribute in avoiding waste by no longer requiring a shrink wrap with LDPE films of the bottle packs. This saves considerable amounts of energy since, for example, shrink wrapping involves six-packs being moved through a heating tunnel which uses large amounts of energy. Furthermore, the new packing process with the inventive adhesives provides smaller packing line footprint and increased packing line speeds. Also, the optical appearance of sixpacks is improved, since undesirable creases in the shrink wrap are avoided. This is highly desirable, because beverage filling companies are especially concerned about the appearance of their packaged product. Generally, the present invention advantageously helps to avoid any secondary packaging of container packs, such as carton or cardboard cases, sheaths, plastic rings, etc.

Examples

In the context of the present invention, unless indicated otherwise, the melt flow rate, melt flow index or simply melt index (MI) is determined in accordance with ASTM D 1238 at a standard temperature of 230° C. and at 5.0 kg load.

The viscosity is determined similar to method ASTM D-3236 as follows. The viscosity of a sample is determined using a Brookfield Laboratories DVH, DV-II, or DV-III Viscometer. The spindle used is a SC-27 hot melt spindle suitable for measuring viscosities in a range between about 100 mPa·s and about 4,000,000 mPa·s. The spindle speed is typically 20 rpm. The sample is placed in a pre-warmed measuring cell, which in turn is inserted into the heating element/container and is locked into place. The viscometer apparatus is lowered and the spindle is submerged into the sample. The sample is heated until it is melted with additional sample being added until the melted sample is about 5 mm higher than the cylinder of the measuring spindle. The viscometer is turned on and set to a shear rate that leads to a torque reading in the range of from 30% to 60%. Readings are taken every minute for about 15 minutes or until the values stabilize. The final reading can be obtained after 30 min and is recorded in mPa·s.

Bundled Bottle Performance Testing

The following testing was used to evaluate the different adhesive compositions for the intended use of bonding packs of bottles.

The testing involved bundling 6 bottles together in a 3 by 2 bottle configuration with an automated test rig (or by hand) at the specified temperature and conditions.

The bond between each two bottles of the six pack was made with an upper and lower adhesive dot. The adhesives dots were placed on the bonded side of each bottle resulting in an adhesive to adhesive bond. The lower dot was between about 2 and 5 cm from the bottom of the bottle, the upper dot was at the upper portion of where the bottles touch.

Each dot comprised two shots of adhesive at the specified amount. This resulted in 14 bonds, 28 shots per six pack. When, 13 bonds are noted, the middle two bottles were bonded to each other with only an upper dot.

The bundled bottles were then stored at the specified storage temperature for at least 12 hours. The bundled bottles were then pulled out of storage and immediately tested according to the procedure below.

Stress testing involved tilting over a six-pack up to five times alternately to the right and left. If a six-pack survived this stress test, it would be lightly hit against a pillar or wall to simulate the consumer e.g. accidentally hitting a car's trunk. As a final stress test a six-pack would be dropped to the ground from a height of approx. 10-30 cm. The results were evaluated and graded as shown below:

Test Procedure
1. Step: 5 times—tilting over the six-pack
2. Step: 3 times—hit the six-pack lightly against a wall
3. Step: 3 times—drop the six-pack down to the floor from approx. 10-30 cm Evaluation:

Grade 1: the six-pack passed all testing steps and bottles showed strong bonding; difficult to remove bottles from the six-pack Grade 2: the six pack passed all testing steps, but some adhesive joints have failed Grade 3: the six pack passed testing steps 1 and 2

Grade 4: the six pack passed testing step 1

Grade 5: the six pack was destroyed after less than 5 times of tilting

Grade 6: the six pack was destroyed during storage or first lifting

Grades 1 to 3 are generally acceptable for most applications of the adhesive compositions.

Ease of Separation

A bottle was pulled from the bonded six pack. The ability to remove the bottle was rated as easy, medium or difficult.

T-Handle Test

A pressure sensitive adhesive (PSA) coated plastic strip was attached to the upper portion of the two bottles in the middle of the pack and then the pack picked up by the plastic strip. If one could carry the pack without any adhesive joints separating, the adhesive "passed" the test.

Softening Point

The softening point is determined according to DIN EN 1427 (Ring and Ball) with the Ring and Ball instrument MC753 as summarized as follows. Two shouldered rings are heated to melt temperature and are placed onto a silicon-papered glass-plate and the melted substance is poured into the rings. After cooling, the excess materials were cut off and the samples were placed into the sample holder of the apparatus and the ball-centering guide with the balls is placed above the samples. A 600 ml NF beaker is filled with 500 ml glycerol and is placed on the heating plate of the MC 753 apparatus. The frame, which is ready for measurement with the shouldered rings, is placed into the beaker in such a way that it is centered on the pins. The temperature sensor is adjusted in the therefore designed opening in the frame and the MC 753 apparatus is activated by choosing the measuring point (keyboard 1-10, basic unit). After a certain pre-heating time, the program automatically runs with a heating rate of 5° C. per minute until the balls fall. The measurement is completed when both balls have fallen down and two temperatures are shown on the display.

Materials:

The following materials were used in the below examples:

Block Copolymers:

GLOBALPRENE 9552U is a SEBS block copolymer thermoplastic elastomer available from LCY Chemical Corp. It has a melt index of around 5.

Plasticizer.

ONDINA 941 is a paraffinic medicinal white oil available from Shell

SHELL OIL 4142 FU is a naphthenic plasticizer oil available from Shell

Aliphatic Hydrocarbon Resins:

ESCOREZ 5320 is a high softening point resin available from ExxonMobil based on cycloaliphatic hydrocarbon resin and having a softening point of 124° C.

ESCOREZ 5400 is a resin available from ExxonMobil based on cycloaliphatic hydrocarbon resin and having a softening point of 100° C.

ESCOREZ 5600 is a resin available from ExxonMobil based on aromatic-modified, cycloaliphatic hydrocarbon resin having a softening point of 100° C. and an aromatic content of 8-11 weight percent.

Aromatic Hydrocarbon Resin:

PICCOTEX 120 is a hydrocarbon resin made from pure aromatic monomer having a high softening point from Eastman Chemical Company (Kingsport, Tenn.) having a softening point of 118° C.

Wax:

MICROCRYSTALLINE WAX HMP is a high melt point hydrogenated microcrystalline wax available from Shell Deutschland Oil GmbH Illustrative Antioxidants Include:

IRGANOX PS 800, Ciba/BASF, dilaurylthiodipropionate

EVERNOX 10, Everspring Chemical Co., sterically hindered phenolic antioxidant

IRGANOX 1010, Ciba/BASF

IRGANOX 1726, Ciba/BASF

IRGAFOS 168, BASF, tris(2,4-di-tert-butylphenyl)phosphite

VULKANOX BHT, Lanxess, 3,5-Di-tert-butyl-4-hydroxy-toluol

ARENOX DL, thioester antioxidant

Coextrudate R 604 is a rubber based, non-tacky material prepared in-house used as sheath material for encasing adhesive Hot melt adhesives were produced having the compositions shown in Tables 1 and 2 below with the amounts given in weight percent.

TABLE 1

| Material | E1 | E2 | E3 | E4 | E5 | E6 | E7 | E8 | E9 |
|---|---|---|---|---|---|---|---|---|---|
| Block copolymer | 27.5 | 29.5 | 29.5 | 29.5 | 28 | 28 | 28 | 28 | 28 |
| ONDINA 941 | 37.8 | 33.8 | 33.8 | 33.8 | 32.3 | 30.3 | 32.3 | 35.3 | 35.3 |
| ESCOREZ 5400 | 16 | 18 | 24 | — | — | — | 17 | — | — |
| ESCOREZ 5320 | — | — | — | 18 | 17 | 17 | — | 15.5 | 11 |
| ESCOREZ 5600 | — | — | — | — | — | — | — | — | — |
| PICCOTEX 120 | 16 | 16 | 10 | 16 | 15 | 15 | 15 | 13.5 | 18 |
| Wax | — | — | — | — | 5 | 7 | 5 | 5 | 5 |
| Coextrudate R 604 | 2 | 2 | 2 | 2 | 2 | 2 | 2 | 2 | 2 |
| Antioxidants | 0.7 | 0.7 | 0.7 | 0.7 | 0.7 | 0.7 | 0.7 | 0.7 | 0.7 |
| Aromatic/Aliphatic resin ratio | 1:1 | 1:1.125 | 1:2.4 | 1:1.125 | 1:1.13 | 1:1.13 | 1:1.13 | 1:1.15 | 1.63:1 |
| Viscosity @ 175° C. [mPa · s] | 6425 | 9100 | 6700 | 9750 | 5600 | 6500 | — | 5100 | 6200 |

TABLE 2

| Material | E10 | E11 | E12 |
|---|---|---|---|
| Block copolymer | 28 | 29.5 | 29.5 |
| SHELL OIL 4142 FU | 32.3 | 33.8 | 33.8 |
| ESCOREZ 5320 | 17 | 18 | 22 |
| PICCOTEX 120 | 15 | 16 | 12 |
| Wax | 5 | — | — |
| Coextrudate R 604 | 2 | 2 | 2 |
| Antioxidants | 0.7 | 0.7 | 0.7 |
| Aromatic/Aliphatic resin ratio | 1:1.13 | 1:1.125 | 1:1.83 |
| Viscosity @ 175° C. [mPas] | 4700 | — | — |

Bundled Bottle Testing

The bottle tested comprised 0.16-0.24 mm thick PET. The bottles were 1.5 liters in size and were filled with carbonated water.

TABLE 3

|  | E3 | E3 | E4 | E5 | E6 | E10 |
|---|---|---|---|---|---|---|
| Bottle type | PET | PET | PET | PET | PET | PET |
| AT [° C.] | 165 | 175 | 165 | 165 | 170 | 175 |
| Glue amount per shot [g] bottom/top shot if different | 0.08 | 0.08 | 0.03/ 0.05 | 0.05 | 0.08 | 0.08 |
| No. of dots (2 shots per dot) | 14 | 14 | 14 | 14 | 13 | 14 |
| ST (5° C.) BT (22-25° C.) | 1 | 1 |  | 1 | 1 |  |
| Separation | Med | Easy |  | Easy | Diff |  |
| ST (5° C.) BT (4-10° C.) | 1 | 1 |  | 1 | 3 | 1 |
| Separation | Easy | Easy |  | Easy | Easy | Easy |
| ST (22-25° C.) BT (22-25° C.) |  |  | 1 | 1 | 1 |  |
| Separation |  |  | Easy | Easy | Med |  |
| ST (22-25° C.) BT (4-10° C.) |  |  |  | 1 | 1 | 1 |
| Separation |  |  |  | Easy | Easy | Easy |
| ST (35° C.) BT (22-25° C.) | 1 | 1 | 1 | 1 | 1 |  |
| Separation | Easy | Diff | Easy | Easy | Med |  |
| ST (35° C.) BT (4-10° C.) | 3 | 4 |  |  | 1 | 1 |
| Separation | Easy | Diff | Easy | Easy | Easy | Easy |
| T-handle Test | Pass | Pass | Pass | Pass | — | Pass |

AT means application temperature
ST means storage temperature
BT means bond temperature

What is claimed is:

1. A container pack comprising a plurality of plastic containers, wherein the containers are bonded to each other with an unfoamed hot melt adhesive composition comprising based on the total weight of the hot melt adhesive composition:
   a) more than 25 weight percent of at least one block copolymer;
   b) from about 27 to about 45 weight percent of at least one plasticizer;
   c) from about 18 to less than about 55 weight percent of a combination of at least two different resins; and
   d) up to 10 weight percent of at least one wax.

2. The container pack of claim 1 wherein the containers comprise a plastic selected from a group consisting of polyethylene terephthalate, polyethylene napthalate, other polyesters, polyethylene, polypropylene, polystyrene, polycarbonate and combinations thereof.

3. The container pack of claim 2 wherein the containers comprise polyethylene terephthalate.

4. The container pack of claim 1 wherein the at least two different resins of the hot melt adhesive composition comprise at least one aromatic hydrocarbon resin and at least one aliphatic hydrocarbon resin, and wherein the weight ratio of aromatic hydrocarbon resin to aliphatic hydrocarbon resin is 3:1 to 1:3.

5. The container pack of claim 1 wherein the hot melt adhesive composition has a Brookfield viscosity of from about 4,000 to about 12,000 mPas at 175° C.

6. The container pack of claim 1 wherein the contents of the containers is a beverage.

7. A hot melt adhesive composition comprising based on the total weight of the hot melt adhesive composition:
   a) from about 25 to about 40 weight percent of the at least one non-functionalized block copolymer selected from the group consisting of a styrene-ethylene/butylene-styrene (SEBS), styrene-ethylene/propylene-styrene (SEPS), and a styrene-ethylene-ethylene/propylene-styrene block copolymer;
   b) from about 27 to about 45 weight percent of the at least one plasticizer;
   c) from about 26 to about 40 weight percent of a combination of at least two different resins wherein the combination of at least two different resins comprises at least one aromatic hydrocarbon resin and at least one aliphatic hydrocarbon resin and wherein the at least two different resins both have a Ring & Ball softening point of at least about 110° C., wherein the weight ratio of aromatic hydrocarbon resin to aliphatic hydrocarbon resin is 3:1 to 1:3, and
   wherein the aliphatic hydrocarbon resin is selected from the group consisting of aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof, and
   the aromatic hydrocarbon resin comprises monomers selected from the group consisting of styrene, alpha methyl styrene, vinyl toluene, and indene; and
   d) from 0 to about 8 weight percent of at least one wax, wherein the composition is free of additional polymers and the sum of components a), b), c) and d) amounts to at least 90 weight percent of the total adhesive composition.

8. The hot melt adhesive according to claim 7, wherein
   (a) the at least one block copolymer has a styrene content of about 20 to about 40 weight percent; and
   (b) the at least one block copolymer has a diblock content of 20 weight percent or less.

9. The hot melt adhesive composition according to claim 7, wherein the at least one plasticizer is a mineral oil.

10. The hot melt adhesive composition according claim 7, wherein the wax is present at from about 3 weight percent to about 8 weight percent and is selected from the group consisting of paraffin waxes, microcrystalline waxes, Fischer-Tropsch waxes, synthetic high melting point waxes (HMP), polyethylene wax and, polypropylene wax.

11. The hot melt adhesive composition according to claim 7, farther comprising at least one additive selected from the group consisting of antioxidants, antiblock additives, pigments, rheology modifying additives, adhesion promoters and fillers.

12. The hot melt adhesive composition according to claim 7, wherein the hot melt adhesive composition has a Brookfield viscosity at a temperature of 175° C. from about 4,000 to about 12,000 mPa·s.

13. The container pack of claim 1, wherein the sum of components a), b), c) and d) amounts to at least 90 weight percent of the total hot melt adhesive composition.

14. The hot melt adhesive composition according to claim 7, wherein the sum of components a), b), c) and d) amounts to at least 95 weight percent of the total hot melt adhesive composition.

* * * * *